(No Model.)
J. WEED & M. B. WILLIAMS.
Fruit Basket Crate.
No. 233,448.          Patented Oct. 19, 1880.
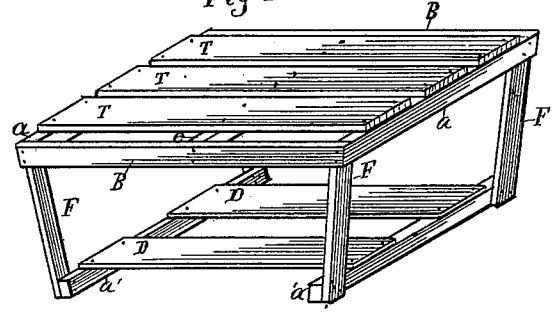
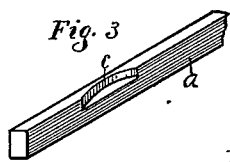
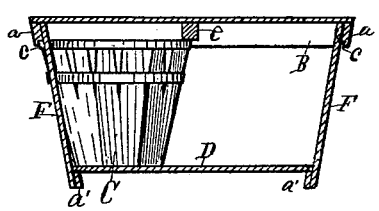
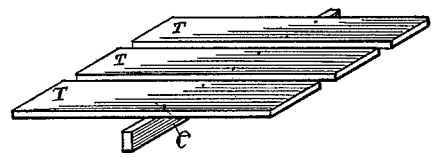
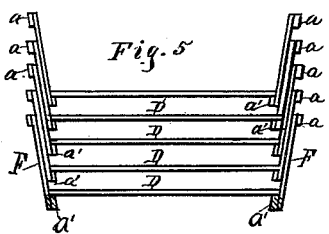
Attest.
John C. Perkins.
John H. Chase
Inventor.
Joshua Weed and Malcolm B. Williams
By Lucius C. West.
Atty

UNITED STATES PATENT OFFICE.

JOSHUA WEED, OF DOUGLAS, AND MALCOLM B. WILLIAMS, OF KALAMAZOO, MICHIGAN.

FRUIT-BASKET CRATE.

SPECIFICATION forming part of Letters Patent No. 233,448, dated October 19, 1880.

Application filed July 30, 1880. (No model.)

*To all whom it may concern:*

Be it known that we, JOSHUA WEED, of Douglas, Michigan, and MALCOLM B. WILLIAMS, of Kalamazoo, Michigan, have jointly invented new and useful Improvements in Fruit-Basket Crates, of which the following is a specification.

Our invention relates to crates designed for shippers' use in transporting baskets of fruit from one point to another. It has for its objects the construction of a crate and cover of a given description, whereby greater convenience in loading them with baskets is effected; but very little lumber is used; the baskets are held securely in place and well protected, yet at the same time open in a manner that the fruit can be readily seen; and the crates can be nested or packed one in the other, and the covers stacked in tiers, in order to utilize space in the shipping-car when sending said crates from the factory to the fruiterer.

Another object we seek to effect is to produce a crate so cheap that the fruit-shipper can better afford to lose the crate than to pay freight on its return to him, for the reason that they are as frequently destroyed as returned, even if their return is required, in which event, in the case of previously-constructed devices, the shipper incurs great loss.

Its further construction and use we will explain in connection with the following description of the drawings, forming a part of this specification, in which—

Figure 1 is a perspective view of the crate with cover adjusted; Fig. 2, a cross-sectional view, showing location of a fruit-basket and its relation to our crate; Fig. 3, an under-edge and inner-face view of one of the cleats forming the rim. Fig. 4 is a perspective view of the cover, and Fig. 5 mode of nesting or packing one crate into another.

$a'$ $a'$ are the cleats secured to the base of posts F F. Slats D D are secured at each end to the cleats $a'$ $a'$, and B B and $a$ $a$ are the cleats forming the rim at the top of the posts F F. In the under and inner face of cleats $a$ $a$ are formed elliptical mortises or slots $c$ $c$. (Seen in Figs. 2 and 3.)

In crates for holding four baskets, C, being the kind for which our crate is especially designed, four mortises, $c$, are required, two in each cleat $a$, a little from each end. The purpose of these mortises is to receive a part of the rim of the basket, as seen in Fig. 2.

To illustrate, we place two baskets at points indicated by D D in Fig. 1. Two other baskets are then placed opposite to them, and as the crate is made of a size that the baskets fit in snugly, the two baskets are sprung in place, their outer ends engaging with the mortises $c$ $c$ of the opposite cleat, $a$. The cover is so constructed that its cleat, $e$, secured to slats T T, rests on the inner rims of the four baskets, which engage each other in the center of the crate, extending half-way over each rim when said cover is adjusted to the crate. Said engagement is illustrated at $e$ in Fig. 2. Nails are then driven through cleats B B into each end of cleat $e$, and the slats T T of the cover are secured by nails to cleats $a$ $a$, Fig. 1.

Cleats or strips $a'$ $a'$ and $a$ $a$ are made of thick material, in order to nail the slats D D and T T to them, and in order to form mortises $c$ $c$ in the rims $a$ $a$ and B B. The cleat $e$ is also made thick for nailing the cleat T T to it, and that it may extend sufficiently over the rim of the baskets C.

It will also be seen that the perpendicular width of cleat $e$ must correspond with the distance from the upper face of mortise $c$ in cleat $a$ to the upper edge of said cleat, in order that the bearing of the cleats $e$ and $a$ upon the rim of the basket will be equal when the slats T T are secured to cleats $a$ $a$. The posts F F and slats D and T are made thinner than the other parts, and all parts as light as possible in conformity with strength.

When wooden covers are used on the baskets C in place of tarlatan, the cleat $e$ of the crate-cover may be beveled or mortised on its two lower corners or edges, if necessary, to receive and engage the sides of said covers.

By the crates being made larger at the top they conform to the form of the fruit-baskets C, and can be nested, as shown in Fig. 5, for the object stated.

The object of constructing the covers separate from the crates proper is for the reasons already given, and that it obviates the necessity of constructing them when needed for use, or of severing them from the crate when desiring to fill the same with baskets.

What we claim, and desire to secure by Letters Patent, is—

1. A fruit-basket crate consisting of cleats $a\,a$, with their elliptical mortises $c\,c$, cleats B B, $e$, and $a'\,a'$, posts F F, and slats T T D D, said parts constructed, arranged, and connected substantially as specified and shown, to effect the objects set forth.

2. A fruit-basket crate having elliptical mortises $c\,c$ in its cleats $a\,a$, cleat $e$, and slats D D, engaging the rims and bottoms of the baskets contained therein, substantially as set forth.

JOSHUA WEED.
MALCOLM B. WILLIAMS.

Witnesses:
CHAS. L. SCHILLING,
JOHN H. CHASE.